Patented Aug. 21, 1951

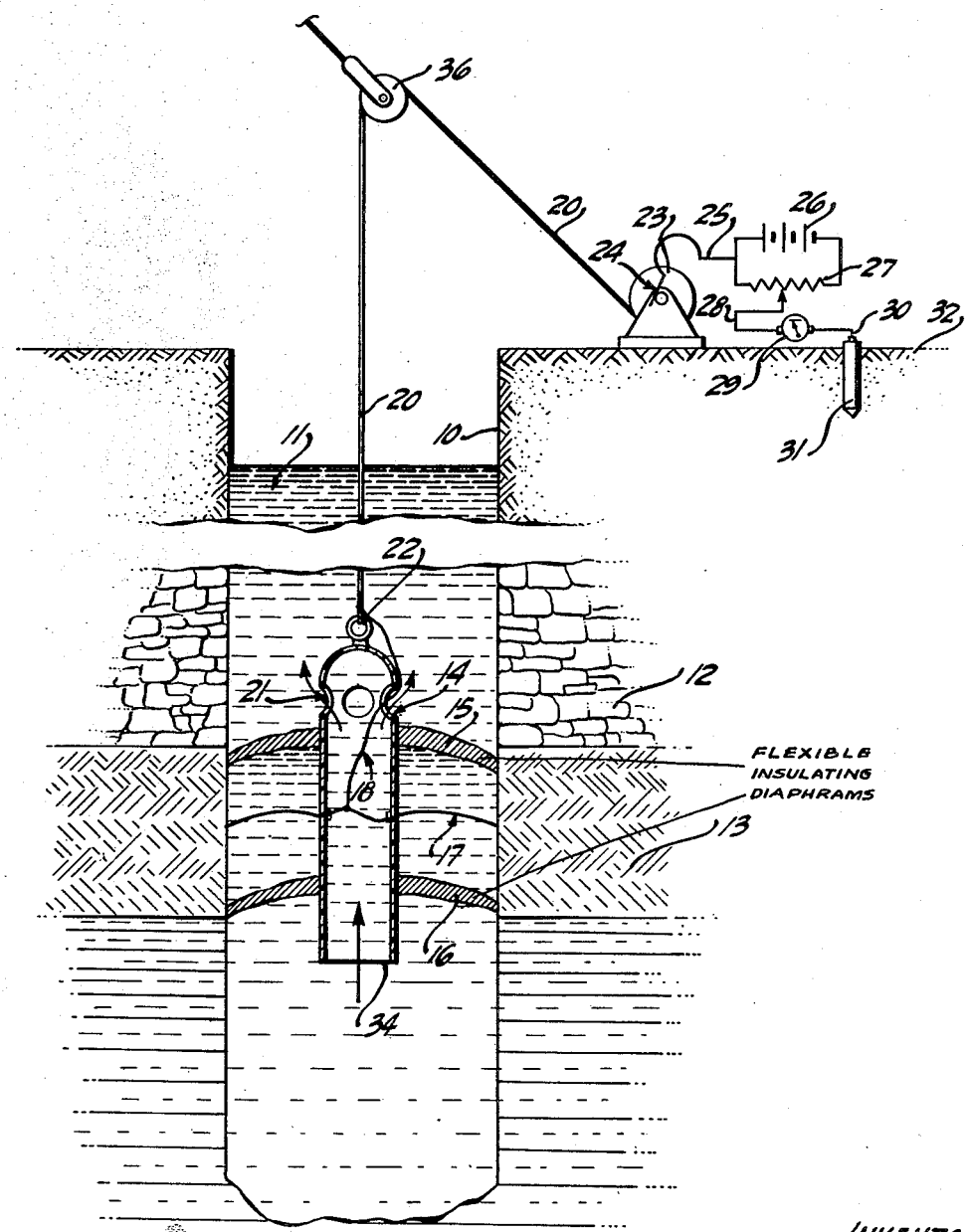

2,564,861

UNITED STATES PATENT OFFICE 2,564,861

METHOD AND APPARATUS FOR BOREHOLE LOGGING

John E. Sherborne, Whittier, Calif., assignor to Union Oil Company of California, Los Angeles, Calif., a corporation of California Application October 13, 1949, Serial No. 121,095

9 Claims. (Cl. 175—182)

This invention relates generally to new methods and apparatus for the logging of bore holes by electrical means. More particularly, this invention relates to the logging of bore holes which are filled with electrically conductive fluids by means of the self potential method.

In the self potential method of electric logging a conductive electrode probe or traveling electrode is lowered in the bore hole to contact the formation surrounding the bore hole whereby variations of electrical properties, e. g., the self potential relative to a ground at the earth surface, are observed and recorded. Such measurements are generally made in the absence of appreciable current flow to minimize contact potentials. Recently, the practice of using saline drilling fluids containing appreciable concentrations of strong electrolytes has become more prevalent than formerly was the case. Such drilling fluids are in themselves good conductors and tend to provide alternative electrical paths which offer less resistance than the path through the particular section of the formation under electrical scrutiny.

It is therefore an object of this invention to provide a means for electrically segregating small sections of surrounding formation during an electric logging operation.

It is another object of this invention to provide a means for electric logging the formation surrounding a well bore by the self potential method relative to a ground at the earth surface in those cases where the bore hole is filled with a conductive fluid.

It is another object of this invention to minimize the effects of the conductivity of a bore hole fluid during electric logging by the self potential method.

Briefly, this invention comprises lowering an electrode into a bore hole wherein contact is established between a horizontal section of the formation and a circumferential contacting surface of the electrode which surface is conformable to the wall of the bore hole. The electrode is supported by an insulated electrode body. Juxtaposed above and below the flexible traveling electrode and also supported by the insulated electrode body are two flexible non-conducting bodies whose respective circumferential contacting surfaces also conform to the wall of the well bore and insulate the electrode from the conductive fluid in the bore hole above and below the electrode. The flexible electrode contacting surface is electrically connected through insulated leads to an insulated conductor cable which, enclosed in a supporting cable, passes upwardly through the bore hole to a suitable indicating or recording instrument located at the earth surface. Suitable means are provided to by-pass drilling fluid through the electrode during its descent or ascent in the bore hole. In the self potential method the potential difference between a suitable contact embedded in the earth surface in the neighborhood of the well bore and the points of the formation contacted by the surface of the traveling electrode is continuously recorded on a suitable instrument.

The attached figure illustrates one embodiment of the invention.

Referring more particularly to the attached figure, bore hole 10 extending downward from earth surface 32 through various earth formation strata 12 and 13 is filled with electrically conductive bore hole fluid 11. Electrode body 14 is fitted with disc type flexible traveling electrode 17 which, during its vertical movement in the bore hole, continuously contacts various formation strata to be logged such as formation strata 13. Traveling electrode 17 may be disc shaped, rib shaped, or it may comprise one or more arms extending outwardly to the formation. Electrode body 14 is open at the lower end 34 and has a series of holes 21 near its upper end. During ascent or descent of the electrode the bore hole fluid flows in one end, through the hollow body, and out the other end of electrode body 14. Electrode body 14 is fashioned of a non-conducting material, such as a polymeric plastic, e. g., Lucite, or is suitably insulated so that it doesn't conduct electrical energy through its thickness.

Flexible traveling electrode 17 is at all times electrically insulated from electrically conductive bore hole fluid 11 by means of disc-shaped, or other suitably shaped flexible insulating diaphragms 15 and 16. The traveling electrode is connected through insulated lead 18 to insulated conducting cable 20. Insulated conducting cable 20 is attached to eye 22 and thereby supports electrode body 14 attached thereto. The insulated conducting cable extends upwardly from the electrode body 14 to the earth surface 32 through wheel support 36 to winding drum 23 on which it can be wound or unwound. Winding drum 23 is located at the earth surface and is fitted with contactor 24 which maintains continuous electrical contact with the upper end of conducting cable 20.

At the earth surface 32 a source of variable electromotive force is provided by fixed source of E. M. F. 26 and potentiometer 27. Line 25 connects one terminal of the variable E. M. F. to contactor 24 which in turn continuously contacts the upper end of conducting cable 20 as the winding drum 23 raises and lowers the traveling electrode 17 within the bore hole. Line 28 connects the second terminal of the variable E. M. F. to recording-indicating voltmeter 29 which is in turn connected through line 30 to stationary electrode 31 embedded in earth surface 32 to act as a ground.

For making a self potential log the assembled electrode is first lowered into the bore hole to the section of the formation to be logged. The variable E. M. F. source is adjusted by moving the slide wire of potentiometer 27 in order to bring the sum of the variable E. M. F. and that of the self potential of the formation between the traveling electrode 17 and the stationary electrode 31 within the scale of recording-indicating voltmeter 29. The traveling electrode 17 is then raised or lowered within the bore hole to contact other sections of the formation by winding or unwinding the winding wheel 23. The potential variations between traveling electrode 17 and stationary electrode 31 are continuously recorded on voltmeter 29 while a simultaneous record of the depth of the traveling electrode 17 is made by any suitable independent means not shown, e. g., by measuring the amount of cable which has been played out from winding drum 23. A self potential log is thereby obtained which is relatively independent of the conductivity of the bore hole fluid.

In general the flexible traveling electrodes employed in this invention are fashioned from any suitable flexible metallic shapes which can be made to conform to the circumference of the bore hole and maintain contact with at least a part thereof at all times during the testing. These electrodes may be woven metal, spun metal or any other such form for accomplishing this purpose. In one modification of the invention the circumference of the electrode may comprise a network of fine flexible metal fibers which extend outward from the main body of the electrode to contact the earth formation.

The non-conducting, insulating surfaces above and below the electrode are preferably Neoprene synthetic rubber or other such flexible insulating means. In the modification shown in the foregoing illustration the protecting insulators are disc-shaped with tapered outer edges. It is apparent that the shape of the insulator is of little consequence provided it fulfills the purpose of completely insulating the electrode from the main body of the bore hole fluid both above and below the electrode during the vertical movement of the electrode. Such insulating surfaces may be provided with insulated metallic ribbing, springs or reinforcements in order to assist their conforming to the circumferential shape of the bore hole under varying conditions of bore hole diameter and eccentricity.

In the operation of my invention it is not always necessary that the traveling electrode physically contact the segregated section of the formation being tested. The flexible electrode can be replaced by a suitable metallic contact, or a porous plate saturated with conductive fluid. The metallic contact or the porous plate is bathed by a small body of conductive fluid which is in turn in contact with the formation section. The small body of conductive fluid is electrically insulated from the main body of the bore hole fluid by insulating discs above and below and by the electrode body. Accordingly, the electrode only establishes electrical contact with the section of the wall of the well bore lying between the upper and lower insulating diaphragms. In certain cases a special fluid reservoir may be provided to maintain the annular zone full of conductive fluid wherein the annular zone is the zone which is bounded by the bore hole and the electrode body and by the upper and lower insulating diaphragms.

It is apparent that many modifications of this invention may be made by those skilled in the art without departing from the spirit and scope of the following claims.

I claim:

1. An apparatus for logging a bore hole by the self potential method containing a conductive fluid which comprises a flexible electrode electrically connected through an insulated conductor to a recording means, said electrode having a circumferential contacting surface conformable to the wall of said bore hole, said flexible electrode being interposed between two flexible non-conducting bodies having circumferential contacting surfaces conformable to the walls of said well bore and providing a seal between said electrode and said conducting fluid above and below said electrode respectively.

2. An apparatus for exploring a formation surrounding a well bore by the self potential method wherein said bore hole is at least partially filled with an electrically conductive fluid, which apparatus comprises an electrode body, supporting means for suspending said electrode body coaxially within said bore hole, a flexible metallic electrode supported by said electrode body adapted to press against said formation surrounding said bore hole, an upper flexible insulating diaphragm coaxially attached to and supported by said electrode body above said flexible metallic electrode, said upper flexible insulating diaphragm adapted to press against the periphery of said bore hole thereby providing a fluid tight seal between said electrode body and said periphery of said bore hole above said flexible metallic electrode, a lower flexible insulating diaphragm coaxially attached to and supported by said electrode body below said flexible metallic electrode, said lower flexible insulating diaphragm adapted to press against the periphery of said bore hole thereby providing a fluid tight seal between said electrode body and said periphery of said bore hole below said flexible metallic electrode, a fluid passageway through said electrode body for passing said electrically conductive fluid therethrough, conducting means for transmitting electrical energy from said flexible metallic electrode to the earth surface and means for measuring the potential difference between said flexible metallic electrode and a ground connection at the earth surface.

3. An apparatus for exploring a formation surrounding a well bore by the self potential method which apparatus comprises an electrode body, a fluid passageway through said electrode body for passing bore hole fluid therethrough during movement of the electrode body in the bore hole, supporting means for suspending said electrode body coaxially within said bore hole, an upper flexible insulating diaphragm coaxially attached to and supported by said electrode body, said upper flexible insulating diaphragm adapted to press against the periphery of said bore hole thereby providing a fluid tight seal between said electrode body and said periphery of said bore hole, a lower flexible insulating diaphragm coaxially attached to and supported by said electrode body, said lower flexible insulating diaphragm adapted to press against the periphery of said bore hole thereby providing a fluid tight seal between said electrode body and said periphery of said bore hole, a fluid tight annular zone bounded by said electrode body and said bore hole and by said upper and said lower insulating diaphragms, said annular zone being filled with an electrically conductive fluid, an electrode establishing electrical contact with said electrically conductive fluid of said annular zone conducting means attached to said electrode for transmitting electrical energy from said electrode to the earth surface and means for measuring the potential difference between said electrode and a ground at the earth surface.

4. A method of investigating the earth formation traversed by a bore hole filled with a column of conductive fluid which comprises electrically segregating a small horizontal section of said earth formation, establishing electrical contact with said small horizontal section by pressing a solid electrical conductor against said horizontal section, and determining the potential difference between said small horizontal section and another section of said earth formation.

5. A method of investigating the earth formation traversed by a bore hole filled with a column of conductive fluid which comprises electrically segregating a small horizontal section of said column of conductive fluid surrounded by a portion of the wall of said bore hole by interposing a non-conducting insulating surface above and below said horizontal section, establishing electrical contact with said portion of said wall of said bore hole by pressing a solid conductor against said portion of said wall of said bore hole, and determining the potential of said portion of the wall of said bore hole relative to another location in said earth formation.

6. A method according to claim 5 wherein said establishing electrical contact comprises physically contacting said portion of the wall of said bore hole at a plurality of points about the circumference of said portion with a metallic contact.

7. A method of investigating the earth formation traversed by a bore hole filled with a column of conductive fluid which comprises electrically segregating a small horizontal section of said column of conductive fluid surrounded by a portion of the wall of said bore hole by interposing a non-conducting insulating surface above and below said horizontal section, establishing electrical contact with said portion of said wall of said bore hole by pressing a solid conductor against said portion of said wall of said bore hole, and determining the potential of said portion of the wall of said bore hole relative to another location in said earth formation under conditions of substantially no current flow.

8. An apparatus for logging a bore hole by the self potential method wherein said bore hole contains a conductive fluid which apparatus comprises electrical insulating means for electrically segregating a small horizontal section of earth formation surrounding said bore hole, a solid electrode adapted to press against said small horizontal section and establish electrical contact therewith, an electrical indicating instrument, and electrically insulated conducting means for conveying electrical energy from said electrode to said electrical indicating instrument.

9. An apparatus for logging a bore hole containing a conductive fluid by the self potential method, which apparatus comprises a solid electrode electrically connected through an insulated conductor to a recording means, said electrode having a surface adapted to contact the wall of said bore hole, said electrode being interposed between two flexible non-conducting bodies having circumferential contacting surfaces conformable to the walls of said well bore and providing a seal between said electrode and said conducting fluid above and below said electrode respectively.

JOHN E. SHERBORNE.

REFERENCES CITED

The following references are of record in the file of this patent:

UNITED STATES PATENTS

| Number | Name | Date |
| --- | --- | --- |
| 2,233,420 | Leonardon | Mar. 4, 1941 |
| 2,388,896 | Aiken | Nov. 13, 1945 |
| 2,502,775 | Brandon | Apr. 4, 1950 |